United States Patent [19]

Balinte et al.

[11] 4,113,022

[45] Sep. 12, 1978

[54] PLANT PULLER

[76] Inventors: Joe Balinte; Michael Verhaeghe, both of P.O. Box 273, Courtland, Ontario, Canada

[21] Appl. No.: 734,091

[22] Filed: Oct. 20, 1976

[51] Int. Cl.² .......................................... A01D 25/04
[52] U.S. Cl. ................................................ 171/61
[58] Field of Search ................ 171/58, 61, 21, 32, 171/101, 103, 104

[56] References Cited

U.S. PATENT DOCUMENTS

| | | | |
|---|---|---|---|
| 2,924,283 | 2/1960 | Macphee | 171/58 |
| 3,693,721 | 9/1972 | Arnold et al. | 171/61 |
| 3,743,024 | 7/1973 | Mayo et al. | 171/61 |

FOREIGN PATENT DOCUMENTS

1,225,981  3/1971  United Kingdom ............. 171/61
195,745   10/1967  U.S.S.R. ........................... 171/61

Primary Examiner—Russell R. Kinsey
Attorney, Agent, or Firm—Finnegan, Henderson, Farabow & Garrett

[57] ABSTRACT

The invention achieves a mechanical device for pulling seedling plants from the ground in greenhouses and for conveying them by conveyor to a collection receptacle for grading the more mature or better quality plants. Essentially the invention includes an inclined conveyor formed by a pair loop belts, each belt travelling between an idler pulley and a drive wheel, such that the loop belts, being composed of a resilient material such as sponge rubber, are placed in an abutting juxtaposed position to thereby co-operatively form the mechanism which pulls the plant from the ground and as well conveys the plant from the ground toward the collection receptacle.

30 Claims, 11 Drawing Figures

PLANT PULLER

This invention relates to a plant puller.

Particularly this invention relates to a device for pulling seedlings from the ground so that they may be replanted. It has particular application in pulling small tobacco plants from the ground so that they may be transplanted into the fields for growing.

In Southwestern Ontario, Canada, it is common to plant via seed, in greenhouses, tobacco in late March or early April. During the latter part of May and early June growers manually pull the baby tobacco plants from the greenhouses and replant them in the fields, whereupon they grow to be harvested in late summer.

The invention achieves a mechanical device for pulling the seedling plants from the ground in greenhouses and for conveying them via conveyor to a collection receptacle for grading the more mature or better quality plants and subsequent transport to the fields for replanting.

The invention particularly contemplates a mechanical device for pulling the plants from the ground and for conveying them to the collection receptacle for later grading.

The invention also achieves means for selecting more mature (taller) plants for pulling.

The invention therefore contemplates a plant puller for pulling growing plants from a bed comprising:

(a) a frame mounted for travel over the bed;

(b) a conveyor mounted on the frame at an incline position relative to the bed, composed of two loop belts of resilient material, each respectively threaded to travel about its own set of idler and drive wheels and jointly disposing in close proximity to the ground a lower input terminus to the conveyor formed by the two belts being juxtaposed and each looped about one of its wheels to thereby define the input terminus, and having an upper terminus formed by the loop belts being juxtaposed, and each looped about the other of its own wheels, and means for holding the adjacent segments of the loop belts in substantially juxtaposed relation between their respective wheels so that each belt has approximate surface adjacent to that of the other belt from the lower terminus to the upper terminus;

(c) means for counter-rotating each set of wheels and each belt so that the proximate surfaces of the two belts travel in the same direction from the lower terminus to the upper terminus;

(d) a collection receptacle, carried by said frame, and mounted below the upper terminus of the conveyor onto which the pulled plants fall;

(e) means for relatively locating the lower terminus of the conveyor in proximity to the ground; and (f) means for migrating the frame over the bed whereby the co-operative travel of the frame and of the conveyor belts causes the belts at the lower terminus to encompass the stock of the plant and pull it out from the bed and then to convey the plant along the conveyor and to discharge it from the upper terminus whereby the plant falls onto the collection receptacle.

The embodiments of the invention will now be described by way of example and with reference to the drawings in which.

Figures 1, 7, 8, 11:
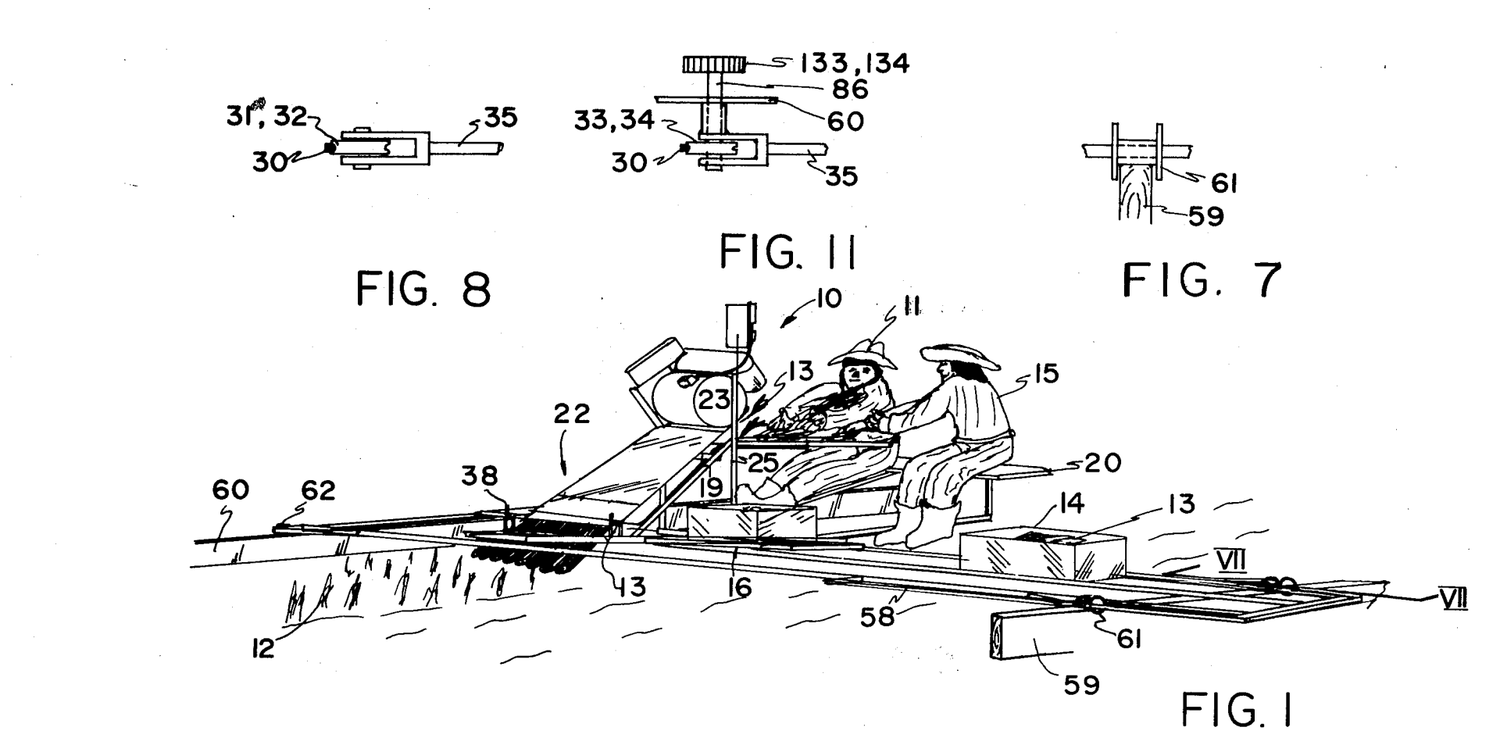
FIG. 1 is a perspective of a plant puller in process of pulling plants from a bed.
FIG. 7 (located on sheet 1 of drawings) is a section along VII—VII of FIG. 1.
FIG. 8 (located on sheet 1 of drawings) is a section of an idler wheel along VIII—VIII of FIG. 4.
FIG. 11 (located on sheet 1 of drawings) is a section along lines XI—XI of FIG. 9.

Referring to FIG. 1, a plant puller 10 is shown which is operated by an operator 11 and a grader 15, and is mounted to travel over a bed of growing plants 12. The operator sits on seat 20 while the grader sits to one or other side of the operator on positional seat 20'.

Figure 2:
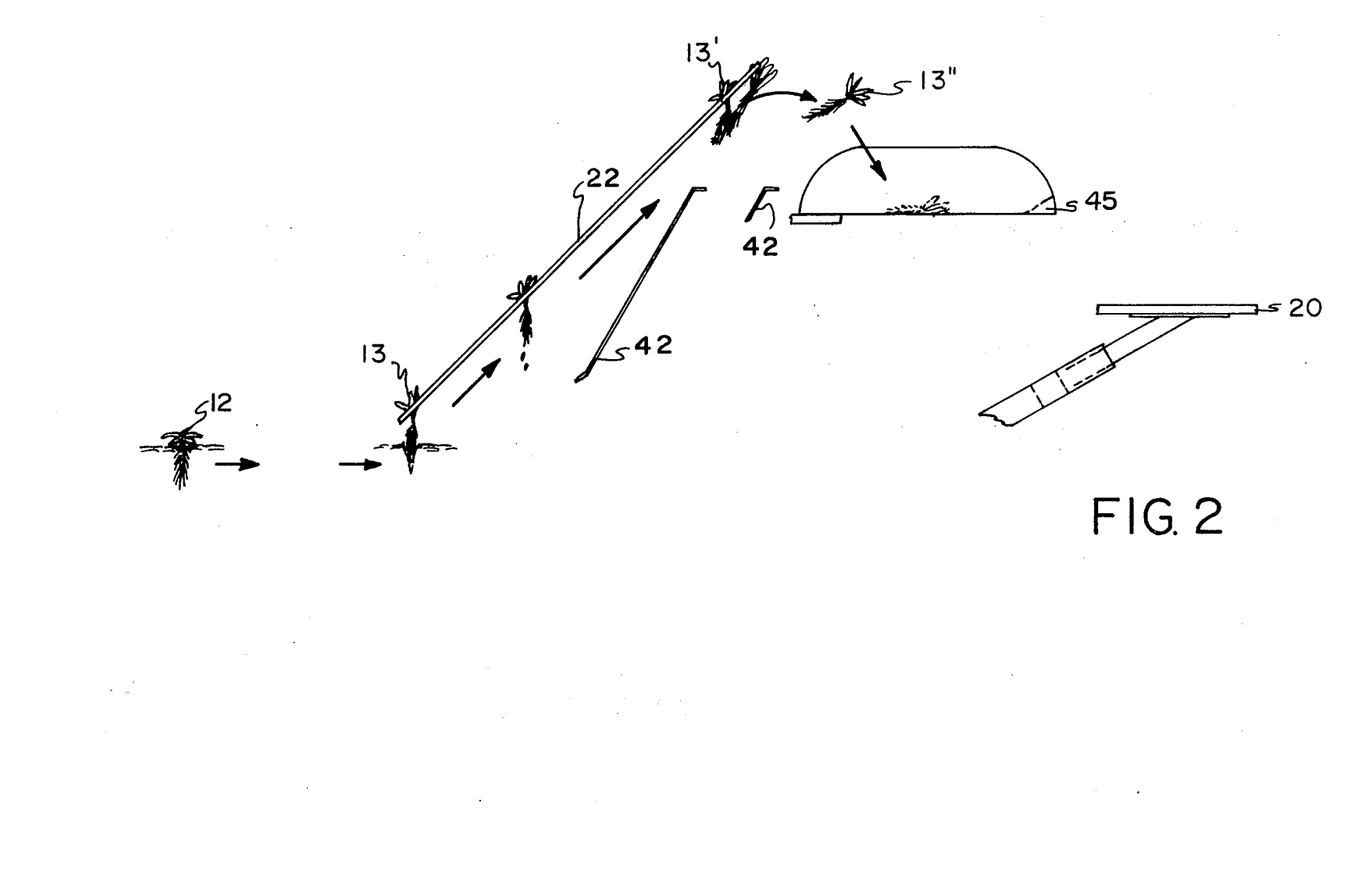
FIG. 2 is a flow chart of the operational steps in plant pulling.

In summary, referring to FIG. 2, the growing plants 12 are pulled from the ground or bed (pulled plant 13) via the lower terminus of an inclined conveyor 22 and moved along the upwardly inclined conveyor 22 to its upper terminus whereby the plant 13 is released, as the plant 13", to fall into a collection receptacle 45 for sorting by the grader 15. The grader 15 places more mature pulled plants 13 into a holding box 14, which is later taken to the fields so that the plants may be replanted there.

Figure 3:
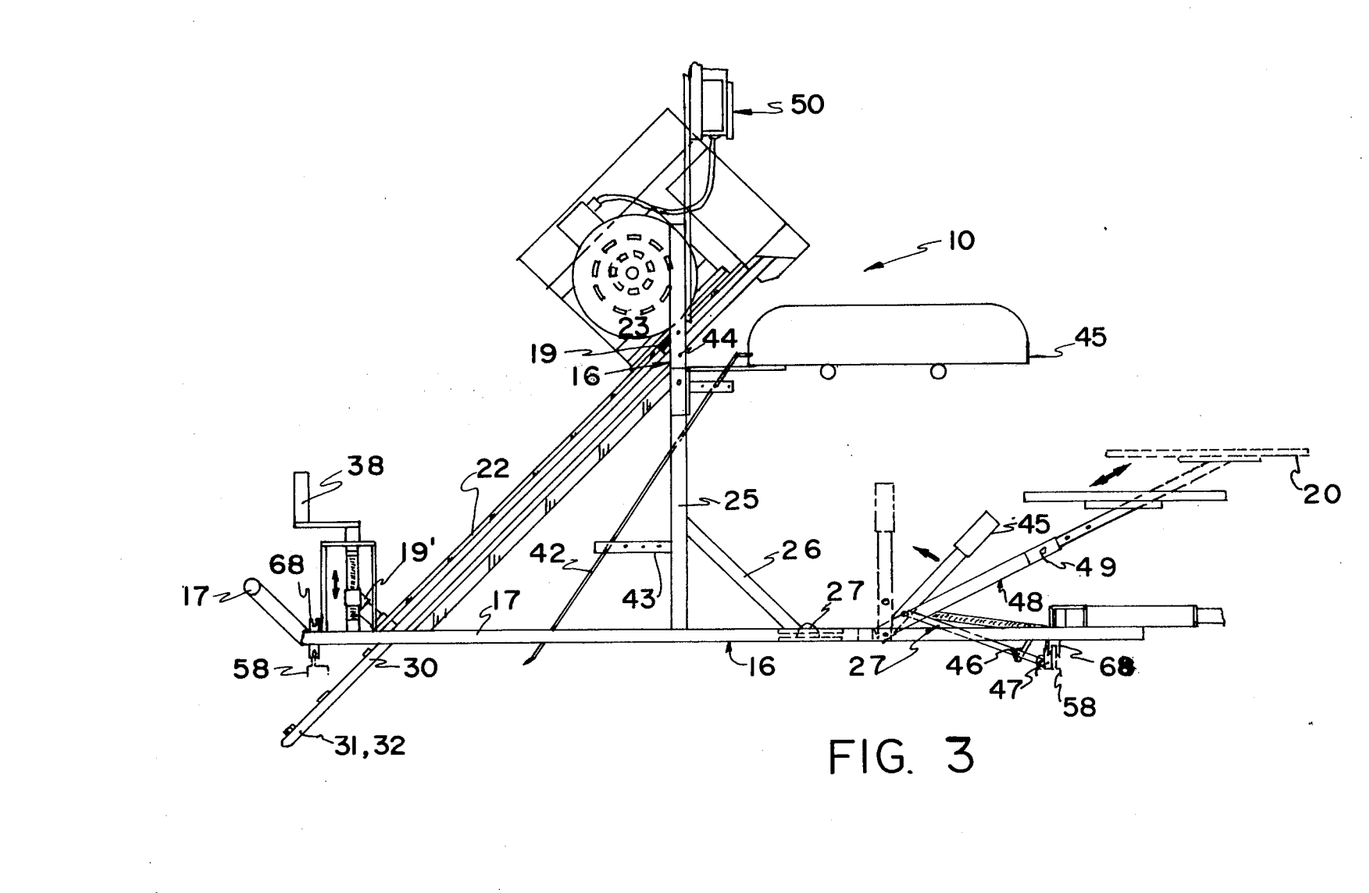
FIG. 3 is a view in elevation of the side of a single conveyor, including plant receptacle and seats for the operator and the grader.
Figures 4, 5:
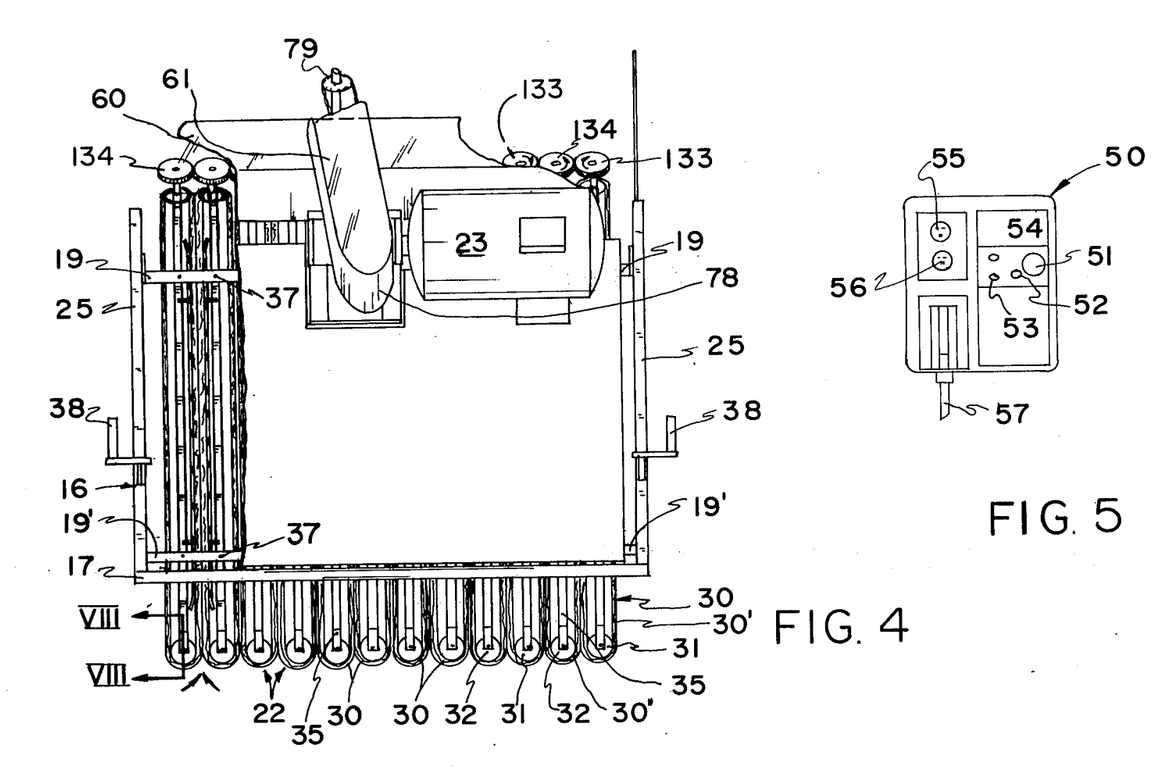
FIG. 4 is the top view with portions broken away of a bank of conveyors with shield in place.
FIG. 5 is the front view of the control box of the plant puller.

Referring to FIGS. 3 and 4 a bank of conveyors 22 for example, six in number, is mounted on the frame 16 of the puller 10. The frame 16 comprises an essentially rectangular outrigger frame 17, with a pair of vertical members 25 and inclined supporting braces 26 holding the vertical members 25 rigid. The vertical members 25 carry between them an upper transverse support bar 19 in elevation to the outrigger frame 17. A lower transverse support bar 19' extends from the sides of the outrigger frame 17 parallel to the upper support bar 19.

Figures 9, 10:
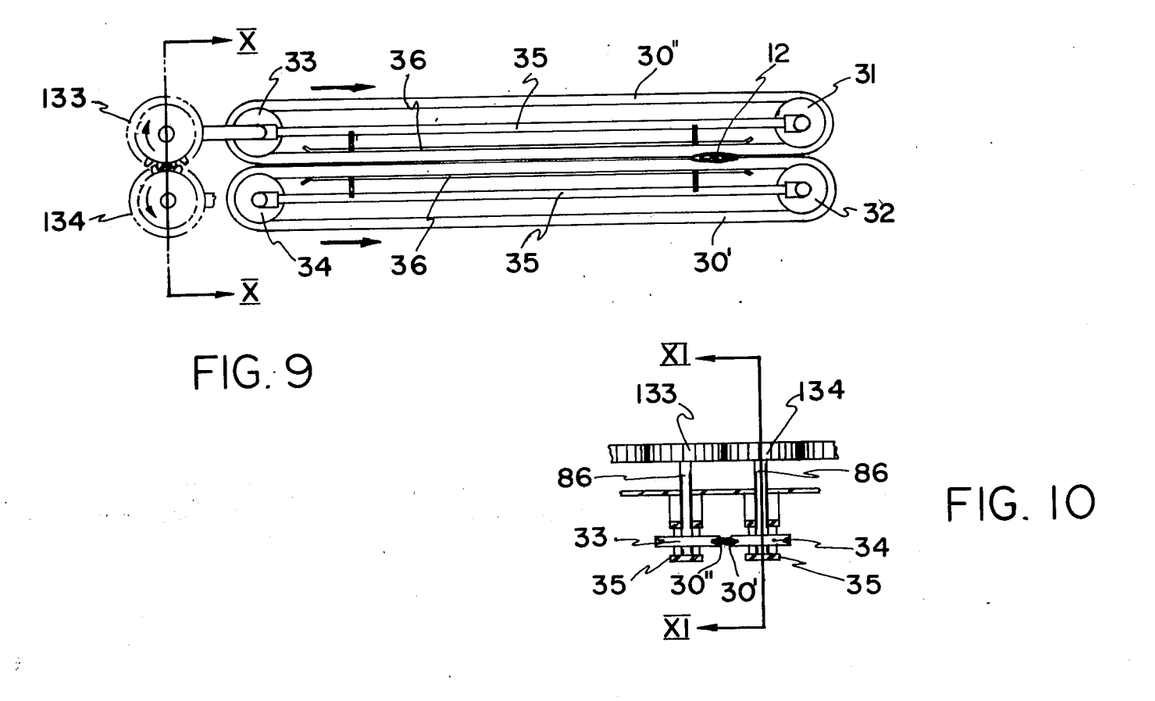
FIG. 9 is a perspective of a single conveyor showing its component parts.
FIG. 10 is an elevation detailing the second prime mover and gearing mechanism to cause the under carriage of the plant puller to migrate over the bed.

Each conveyor 22 is composed of a right elongated loop belt 30' and a left elongated loop belt 30", as shown in FIGS. 4 and 9. They extend to travel, in the case of the right loop belt 30', between a lower idler pulley 31 and an upper drive wheel 33, and for the left loop belt 30" between a lower idler 32 and an upper drive wheel 34. The drive wheels 33, 34 and idler pullies 31 and 32 are respectively relatively proximate while the loop belts 30 are composed of high resilient material having a sponge rubber facing. The arrangement is such that the left and right loop belts touch each other along their abutting faces (proximate surfaces) continuously from the lower terminus of each conveyor 22 (idler pulley regions) to the upper terminus (the drive wheel regions). Each loop belt, idler pulley and drive wheel is an individual subassembly carried by an interconnecting rod 35 which at one end has a journal to accommodate the rotating drive wheel and at the other a journal for the satellite idler pulley, see FIGS. 8 and 9.

A tension bar 36 extends along one side of each interconnecting rod 35 to positionally hold the belts 30' and 30" straight, as shown in FIG. 9. The relative juxtaposition of the adjacent sponge facings of the belts 30' and 30" thus is maintained by the linear tension bar 36 mounted on each supporting bar 35 of a conveyor. These tension bars 36 are mounted relative to each other so as to hold the respective adjacent sponge facings of the belts in close and linear juxtaposition notwithstanding the fact that a plant 12 may be lodged between them as after pulling and during conveying (see FIG. 9) up the conveyor for discharge onto the receptacle. The interconnecting rods 35 are secured to the under side of the lateral crossmembers 19 and 19' as by individual adjustable heads or bolts 37. By this means each belt subassembly may be juxtaposed with its counterpart so that the sponge rubber facings of the belts 30 abut between lower and upper termini and thus form the movable conveying means of the conveyor.

Collectively, the lower termini of the conveyors 22 may be moved relatively upward or downward via cranks 38 (FIG. 3) the lower crossmember 19' is adjustable relative to the frame 16. This adjustment is achieved via two turn cranks 38 mounted on each lateral outrigger frame 17 into which the lower lateral cross member 19' threadingly terminates, to travel during turning of the cranks 38. Positioning of the transverse cross member 19', vertically relative to the outrigger frame 17 is thus achieved whereby the lower termini of the conveyors 22 may be positioned at relative elevation to the ground or bed 12.

The conveyors 22 are powered by a prime mover 23 which is controlled by the operator 11 via a control box 50. Adjacent drive wheels, 33 and 34, of the same conveyor are counter-rotated. This is achieved by rigidly attaching to each drive wheel 33, 34 a gear 133 and 134 respectively all the gears 133 and 134 being aligned and intermeshed to act both as driven and driving gears. It will be seen therefore, that this arrangement counter-rotates neighboring gears. This causes each left 30' and right 30" drive belt of each conveyor 20 to travel together from lower terminus to the upper terminus and hence provide the mechanism to not only pull the plant from the bed but convey the pulled plant up the conveyor and to deposit it on the receptacle. The surfaces of the belts being resilient sponge rubber and the proximate surfaces thereof preferably held in abutting or near abutting relation, the frictional forces produced by the belt surfaces at the lower terminus will "grab" the plant while also yielding and deforming so as not to damage the plant structure (see FIG. 9), and pull it out of the ground due to movement of the belts and the frame migration as is more clearly explained later. The plant is thus gripped and the upwardly inclined travel motion of the belts removes the plants, from the beds and conveys them unharmed to the receptacle.

In operation, referring to FIG. 3, after the plant 13 is pulled, and it rises on the conveyor 22, the roots strike a dragging plant 42 so that surplus earth may be effectively dislodged from the root system of the plants without hurting the root system.

Figure 6:
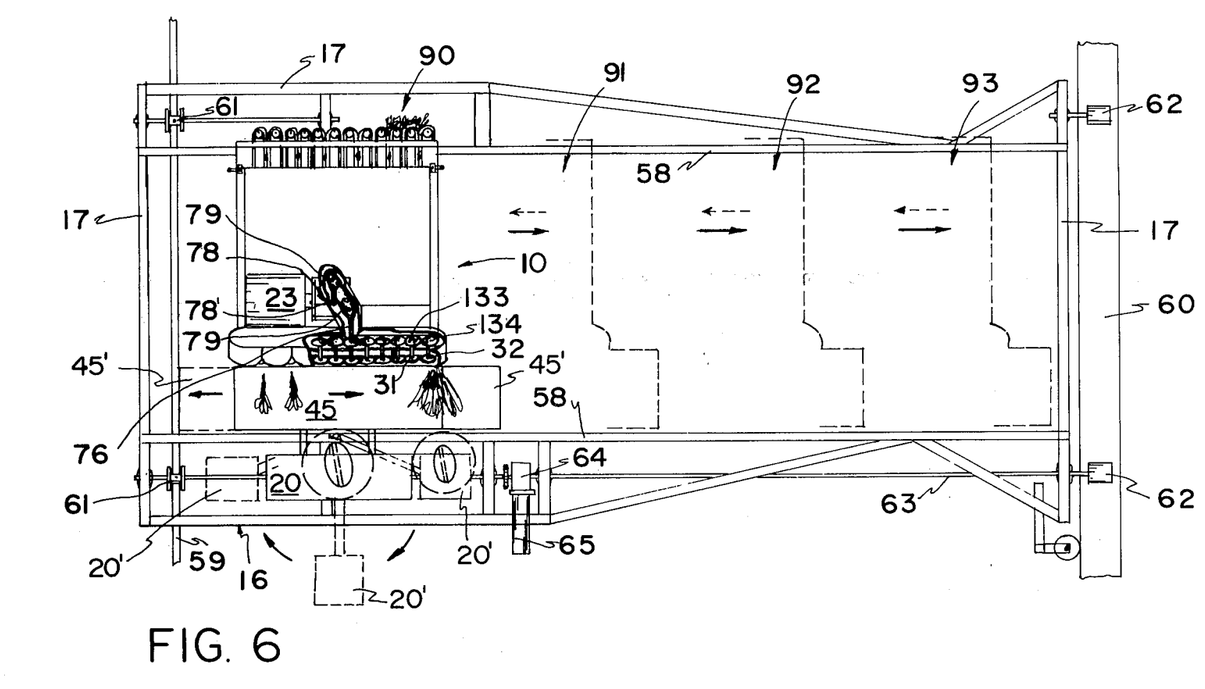
FIG. 6 is a plan view of the plant puller and various lateral locations into which it may be located for pulling plants as when beds are of extreme width.

Now the frame 16 is caused to migrate or move forward over the plants 12, with the aid of lateral tracks 59 and 60, for the purposes of engaging plants into the lower terminus of each conveyor 22 in the following manner. The track 59 is affixed to one lateral margin of the greenhouse (not shown) while the other track 60 is mounted on the other lateral margin of the greenhouse. Alternatively, each of the tracks 59 and 60 must be at least along the outside lateral margins of the bed from which plants are to be pulled. There is an under carriage 58 associated with the frame 16 which extends between the track 59 and 60 upon which the frame 16 rests. This under carriage 58 has along one edge, two beaded rollers 61 which allows the beads to straddle the track. This holds the undercarriage 58 in registry with that track. The other side of the undercarriage 58 rolls over a flat track 60 which acts as a running surface for the running of the drive wheels 62 which are composed of resilient materials such as rubber. One of these wheels is driven to rotate by rotating axis 63 (FIG. 6) which is connected through a drive box 64 to a second prime mover 65 which is located on the outrigger 17. The speed of the second prime mover is also regulated through the control box 50.

Lateral positioning of the frame 16 at any point along the undercarriage 58 permits the location of the frame, and hence the conveyors 22 of the plant puller can be located anywhere on the bed 12. If the undercarriage 58 is fabricated from angle iron then, strategically placed at or near the four corners of the outrigger 17 are notched guide wheels 68 (FIG. 3) which engage the angle iron and permit the frame 16 to be rolled and positioned on the undercarriage 58 at any of the locations shown, for example as 90, 91, 92, 93 in FIG. 6 or at any intermediate location. The frame 16 is secured to any position on the undercarriage 58 simply by a brake mechanism 27 which includes a shoe 47 adapted to urge against the angle iron of the undercarriage and to act as a brake. A shoe rod 46 pivotally attaches the shoe 47 to the "load" position of a pedal 45 which is pivotally attached to the frame 16. When the pedal 45 is pushed down, and it "over-centers" the shoe 47 locks against the angle iron. When it is "kicked-up" (dash position in FIG. 3) the shoe is released and the frame is free to be rolled into the desired position on the undercarriage.

Adjustment for the seat position 20 for the operator is permitted by relatively telescoping the seat support rods 48 and securing them by a pin 49. Further, the receptacle tray 45 is vertically adjustable by aid of apertures 44 located in the vertical member 26 through which bolts relatively secure the tray 45 to the vertical members. These apertures 44 further extend downward along the vertical members 25 so that they can also be used to accommodate relative tilting or positioning of the plant dragging plate 42. Thus the plant dragging plate 42 may be relocated, as required, in co-operation with the adjustment support 43 to position the plate in its preferred operating position so as to dislodge, gently, earth from the root systems of the plants 13 as they move up the conveyor 22. The receptacle or tray 45 is securely mounted to vertical members 25 and has an outboard surface 45' for use by the grader 15. This outboard surface 45' is connectable by suitable means (not shown) to either the left or right side of the main tray 45.

The embodiments of the invention in which an exclusive property or privilege as claimed is defined as follows:

1. A plant puller for pulling growing plants from a bed comprising:
    (a) a frame mounted for travel over the bed;
    (b) a conveyor mounted on the frame at an inclined position relative to the bed, including at least one pair of juxtaposed loop belts of resilient material, each having idler and drive wheels, the pair of belts being jointly disposed to have corresponding lower ends in close proximity to the ground to form an input terminus to the conveyor and having corresponding upper ends forming an upper terminus, and means attached to the frame for holding the adjacent segments of the loop belts in substantially juxtaposed relation between their respective wheels so that each belt has a proximate surface adjacent to that of the other belt from the lower terminus continuously to the upper terminus;

(c) means carried by the frame for counter-rotating each belt and their wheels and each belt so that the proximate surfaces of the two adjacent belts travel in the same direction from the lower terminus to the upper terminus;

(d) a collection receptacle, carried by said frame, and mounted below the upper terminus of the conveyor onto which the pulled plants fall;

(e) a track rigidly positioned at a predetermined distance above the bed;

(f) means for advancing the frame over the track and hence over the bed whereby the cooperative travel of the frame over the bed and of the conveyor belts causes the belts at the lower terminus to encompass the upper portion of the stalk of a plant and to pull the plant out of the bed whereby the plant is conveyed by the conveyor up and along the conveyor to be discharged from the upper terminus thereof and to fall onto the collection receptacle; and (g) means mounted in the frame for locating the lower terminus of the conveyor at a specific predetermined distance from the bed for pulling larger plants above a predetermined height by the plant puller, whereas smaller plants below the predetermined height are left in the bed, during the travel of the plant puller over the bed.

2. The plant puller as claimed in claim 1 wherein the idler wheels of the conveyor are those wheels in close proximity to the ground.

3. The plant puller as claimed in claim 1 wherein there are a plurality of conveyors arranged in a common plane so as to form a bank of inclined conveyors, each having its upper terminus superadjacent to the collection receptacle.

4. The plant puller as claimed in claim 1 wherein the resilient belts have an outer surface of sponge rubber.

5. The plant puller as claimed in claim 1 wherein the resilient belts have an outer surface of sponge rubber and the sponge rubber surfaces of two juxtaposed belts abut.

6. The plant puller as claimed in claim 1 wherein the resilient belts have an outer surface of sponge rubber and the most proximate sponge rubber surfaces of two juxtaposed belts are held in relative parallelism from the lower to the upper terminus.

7. The plant puller as claimed in claim 2 wherein means (c) includes a primer mover, a first gear means and a reversing gear means, drive means for interconnecting one loop belt of each conveyor to the first gear means and another drive means interconnecting the other loop belt of each conveyor to the reversing gear means so that the prime mover drives each loop belt of a conveyor in counter-rotation at the upper wheels of each conveyor such that the loop belts are travelled by the rotation of the drive wheels.

8. The plant puller as claimed in claim 2, wherein the track (e) includes a rail mounted at the predetermined distance from and above the bed and the frame carries a set of wheels, for engaging and travelling over the rail whereby the frame may be migrated over the bed at the predetermined distance by travelling over the rail.

9. The plane puller as claimed in claim 2 wherein the track includes a first set of rails extending substantially the length of the bed, each rail of the first set disposed at the predetermined height over the bed, and a second set of rails formed into an undercarriage having depending wheels, which engage and travel over the first set of rails, whereby the undercarriage may be positioned over a segmental region of the bed, the frame having a set of wheels which depend therefrom to engage the second set of rails so that the frame may be disposed over a portion of the undercarriage and (a) means for positioning the frame at predetermined locations along the undercarriage so that as the undercarriage and hence the frame are adapted to move from one end of the bed to the other for each discrete position of the frame relative to the undercarriage whereby a swath of selected plants may be pulled from the bed by the conveyor.

10. The plant puller as claimed in claim 1, including a front cross member in its frame and means for connecting the lower terminus to the front cross member and means for spacily moving the front cross member relative to the frame whereby the lower terminus assumes, in response to the positional location of the cross member, the specific distance, which is thus variable from the bed, by which the larger plants may be selected for picking from the smaller plants.

11. The plant puller as claimed in claim 8, including a front cross member in its frame and means for connecting the lower terminus to the front cross member and means for spacily moving the front cross member relative to the frame whereby the lower terminus assumes, in response to the positional location of the cross member, the specific distance, which is thus variable from the bed, by which the larger plants may be selected for picking from the smaller plants.

12. The plant puller as claimed in claim 9, including a front cross member in its frame and means for connecting the lower terminus to the front cross member and means for spacily moving the front cross member relative to the frame whereby the lower terminus assumes, in response to the positional location of the cross member, the specific distance, which is thus variable from the bed, by which the larger plants may be selected for picking from the smaller plants.

13. The plant puller as claimed in claim 8, wherein the idler wheels of the conveyor are those wheels in close proximity to the ground.

14. The plant puller as claimed in claim 9, wherein the idler wheels of the conveyor are those wheels in close proximity to the ground.

15. The plant puller as claimed in claim 8, wherein there are a plurality of conveyors arranged in a common plane so as to form a bank of inclined conveyors, each having its upper terminus superadjacent to the collection receptacle.

16. The plant puller as claimed in claim 9, wherein there are a plurality of conveyors arranged in a common plane so as to form a bank of inclined conveyors, each havng its upper terminus superadjacent to the collection receptacle.

17. The plant puller as claimed in claim 1, wherein there are a plurality of conveyors arranged in a common plane so as to form a bank of inclined conveyors, each having its upper terminus superadjacent to the collection receptacle, and including means for lowering the input termini of the conveyors to a specific distance from the bed by which the larger plants may be selected for picking from the smaller plants.

18. The plant puller as claimed in claim 8, wherein there are a plurality of conveyors arranged in a common plane so as to form a bank of inclined conveyors, each having its upper terminus superadjacent to the collection receptacle, and including means for lowering the input termini of the conveyors to a specific distance from the bed by which the larger plants may be selected for picking from the smaller plants.

19. The plant puller as claimed in claim 9, wherein there are a plurality of conveyors arranged in a common plane so as to form a bank of inclined conveyors, each having its upper terminus superadjacent to the collection receptacle, and including means for lowering the input termini of the conveyors to a specific distance from the bed by which the larger plants may be selected for picking from the smaller plants.

20. The plant puller as claimed in claim 8, wherein the resilient belts have an outer surface of sponge rubber.

21. The plant puller as claimed in claim 9, wherein the resilient belts have an outer surface of sponge rubber.

22. The plant puller as claimed in claim 8, wherein the resilient belts have an outer surface of sponge rubber and the sponge rubber surfaces of two juxtaposed belts abut.

23. The plant puller as claimed in claim 9, wherein the resilient belts have an outer surface of sponge rubber and the sponge rubber surfaces of two juxtaposed belts abut.

24. The plant puller as claimed in claim 8, wherein the resilient belts have an outer surface of sponge rubber and the most proximate sponge rubber surfaces of two juxtaposed belts are held in relative parallelism from the lower to the upper terminus.

25. The plant puller as claimed in claim 9, wherein the resilient belts have an outer surface of sponge rubber and the most proximate sponge rubber surfaces of two juxtaposed belts are held in relative parallelism from the lower to the upper terminus.

26. The plant puller as claimed in claim 8, wherein means (c) includes a primer mover, a first gear means and a reversing gear means, drive means for interconnecting one loop belt of each conveyor to the first gear means and another drive means interconnecting the other loop belt of each conveyor to the reversing gear means so that the prime mover drives each loop belt of a conveyor in counter-rotation at the upper wheels of each conveyor such that the loop belts are travelled by the rotation of the drive wheels.

27. The plant puller as claimed in claim 9, wherein means (c) includes a primer mover, a first gear means and a reversing gear means, drive means for interconnecting one loop belt of each conveyor to the first gear means and another drive means interconnecting the other loop belt of each conveyor to the reversing gear means so that the prime mover drives each loop belt of a conveyor in counter-rotation at the upper wheels of each conveyor such that the loop belts are travelled by the rotation of the drive wheels.

28. The plant puller as claimed in claim 1, wherein means means (c) includes a prime mover, a first gear means and a reversing gear means, and drive means for interconnecting one loop belt of each conveyor to the first gear means and another drive means interconnecting the other loop belt of each conveyor to the reversing gear means so that the prime mover drives each loop belt of a conveyor in counter-rotation.

29. The plant puller as claimed in claim 8, wherein means (c) includes a prime mover, a first gear means and a reversing gear means, and drive means for interconnecting one loop belt of each conveyor to the first gear means and another drive means interconnecting the other loop belt of each conveyor to the reversing gear means so that the prime mover drives each loop belt of a conveyor in counter-rotation.

30. The plant puller as claimed in claim 9, wherein means (c) includes a prime mover, a first gear means and a reversing gear means, and drive means for interconnecting one loop belt of each conveyor to the first gear means and another drive means interconnecting the other loop belt of each conveyor to the reversing gear means so that the prime mover drives each loop belt of a conveyor in counter-rotation.

* * * * *

UNITED STATES PATENT AND TRADEMARK OFFICE
CERTIFICATE OF CORRECTION

PATENT NO. : 4,113,022
DATED : September 22, 1978
INVENTOR(S) : JOE BALINTE and MICHAEL VERHAEGHE It is certified that error appears in the above—identified patent and that said Letters Patent are hereby corrected as shown below:

"Insert in heading:

Foreign Application Priority Data:

Canada 259,686, filed August 23, 1976"

Signed and Sealed this

Twenty-third Day of January 1979

[SEAL]

Attest:

RUTH C. MASON
Attesting Officer

DONALD W. BANNER
Commissioner of Patents and Trademarks